(12) United States Patent
Qian et al.

(10) Patent No.: US 8,767,688 B2
(45) Date of Patent: Jul. 1, 2014

(54) VIRTUAL NETWORK IMAGE SYSTEM FOR WIRELESS LOCAL AREA NETWORK SERVICES

(76) Inventors: Lu Qian, Solon, OH (US); James M. Cisar, Wadsworth, OH (US)

( * ) Notice: Subject to any disclaimer, the term of this patent is extended or adjusted under 35 U.S.C. 154(b) by 876 days.

(21) Appl. No.: 12/563,339

(22) Filed: Sep. 21, 2009

(65) Prior Publication Data

US 2010/0074238 A1    Mar. 25, 2010

Related U.S. Application Data

(60) Provisional application No. 61/099,248, filed on Sep. 23, 2008.

(51) Int. Cl.
*H04W 4/00* (2009.01)
*G06F 9/455* (2006.01)
*H04L 12/46* (2006.01)

(52) U.S. Cl.
CPC ............ *G06F 9/45533* (2013.01); *G06F 9/455* (2013.01); *H04L 12/4641* (2013.01)
USPC ............ 370/338; 709/202; 709/220; 709/223

(58) Field of Classification Search
None
See application file for complete search history.

(56) References Cited

U.S. PATENT DOCUMENTS 6,374,293 B1 *  4/2002  Dev et al. ...................... 709/220
7,987,471 B2 *  7/2011  Herzog et al. ................ 719/317

* cited by examiner

*Primary Examiner* — Ian N Moore
*Assistant Examiner* — Brian T Le
(74) *Attorney, Agent, or Firm* — Renner, Kenner, Greive, Bobak, Taylor & Weber

(57) ABSTRACT

A virtual network image system (VNIS) maintaining virtual counterparts for each of the entities in a real-world, physical wireless local area network (WLAN) to which the VNIS corresponds. The virtual counterparts operate in accordance with a communication protocol that corresponds to that of the WLAN and under the control of a VNIS manager component. The VNIS manager component predicts and optimizes operating configurations associated with the virtual counterparts, based on "what-if" analyses, to provide automation of various services relating to the operation of the physical WLAN.

13 Claims, 6 Drawing Sheets

VIRTUAL NETWORK IMAGE SYSTEM FOR WIRELESS LOCAL AREA NETWORK SERVICES

CROSS-REFERENCE TO RELATED APPLICATION

This application claims the benefit of U.S. Provisional Application No. 61/099,248 filed on Sep. 23, 2008, the contents of which are incorporated herein by reference.

TECHNICAL FIELD

The present invention generally relates to wireless local area networks (WLAN). In particular, the present invention relates to methods and systems directed to the optimization of WLAN performance. More particularly, the present invention relates to a system that utilizes virtual images of corresponding components of a real-world, physical WLAN to generate optimized configurations for the automation of various WLAN services.

BACKGROUND

In recent years, wireless local area networks (WLAN) have gained popularity and have been widely deployed. With the need for fast deployment, easy maintenance, and near real-time performance tuning for WLANs, the requirements for services to enable their operation have become increasingly complex, strict, and demanding. For example, WLAN services may include WLAN deployment planning, involving determining the optimal physical placement of fixed wireless nodes, such as access points (AP), including mesh access points; radio frequency (RF) planning for wireless nodes to identify power level settings and RF channel assignments; and WLAN performance tuning based on various performance metrics associated with various WLAN deployment scenarios, etc.

One conventional approach of providing WLAN services is to utilize highly-skilled or expert WLAN administrators to develop the appropriate WLAN operating configurations for a given operating scenario, such as when tuning the performance of the WLAN for example. Moreover, because disturbances and/or degradation in WLAN performance is generally inevitable, and in many cases unpredictable, a series of trials and corrections are typically required before an optimal set of WLAN operating configurations are reached. Moreover, trial parameters, such as wireless medium transmission back off parameters, quality of service related parameters, packet size adaptations, and transmission rate selections, are difficult to accurately identify by human identification because of the large number of dimensions involved in a deployment and the size of total adjustable configuration parameters. Another drawback of the trial and correction approach is that an inappropriate set of configurations can readily reduce network performance, including the rate of data throughput for example. Furthermore, in the case of delay and error-sensitive applications, such as voice and video applications, an inappropriate set of configurations can result in breakdowns in the communication connections, which are exemplified as call drops or stops or pauses in video stream playback.

In addition, the expense in training WLAN administrators to attain the formidably high skill level required of administrating the WLAN inevitably results in higher labor costs for the network operators. Moreover, attracting, acquiring and retaining qualified WLAN administrators cannot always be accomplished because of the high demand for such qualified individuals.

An alternative approach to providing the needed WLAN services is to utilize automated techniques, which reduces the need for highly-skilled WLAN administrators. Automation also facilitates WLAN services, which continue to become more complex and strict. Unfortunately, the capabilities of typical automated WLAN management and services tools are limited, generally only allowing network statistics to be viewed and allowing the configurations to be applied to the entities in the WLAN through a set of "gets" and "sets" operations.

Thus, there are primarily two options that are desirable in the automation of WLAN services. One is to allow a network administrator to perform manual "what-if" analyses, which will identify the optimal answers for given constraints by performing the optimization of network configurations without rounds of trials and corrections in the real-world, physical WLAN. The other option is to optimally tune the WLAN while delivering the set of corresponding optimal configurations. The outcome of the automatic optimization can then be either presented to the WLAN administrator as advice or applied to the WLAN in the real world automatically. However, the ability to automatically tune the WLAN is highly desirable, as such tuning is transparent to the WLAN administrator, leaving him or her unburdened with the otherwise complex task.

Therefore, there is a need for a virtual network image system (VNIS) that provides robust automation tools to enable a broad scope of wireless local area network (WLAN) services. In addition, there is a need for a VNIS that utilizes virtual entities that communicate according to a virtual network protocol that corresponds to the network protocol used by a real-world, physical WLAN. Furthermore, there is a need for a VNIS that provides automation tools to facilitate the automatic analysis of the performance statistics of a WLAN, along with the prediction of new WLAN operating configurations based on predetermined operating parameters.

SUMMARY OF THE INVENTION

In light of the foregoing, it is a first aspect of the present invention to provide an optimization system for optimizing a wireless network comprising a plurality of virtual entities that correspond to network entities of a wireless network, said virtual entities operating in accordance with an operating configuration, wherein said virtual entities communicate in accordance with a virtual network communication protocol that corresponds to a communication protocol of the network entities; and a virtual managing component in communication with said virtual entities, said managing component optimizing said operating configuration based on virtual performance data associated with the operation of said virtual entities.

It is a further aspect of the present invention to provide a method of optimizing the operation of a wireless network comprising representing network entities of a wireless network with corresponding virtual models that communicate in accordance with a virtual network protocol that corresponds to the protocol of the wireless network, executing the operation of said virtual models in accordance with a predetermined operating configuration, acquiring performance statistics based on the execution of said virtual models and the wireless network, comparing said performance statistics of said virtual models with the performance statistics associated with the wireless network, and optimizing said operating configuration based on said comparing step.

Yet another aspect of the present invention is to provide a method of optimizing the operation of a wireless network comprising representing network entities of a wireless network with corresponding virtual models that communicate in accordance with a virtual network protocol that corresponds to the protocol of the wireless network, executing the operation of said virtual models in accordance with a predetermined operating configuration, acquiring performance statistics based on the execution of said virtual models, and optimizing said operating configuration if said performance statistics do not meet predetermined criteria.

DESCRIPTION OF THE DRAWINGS

These and other features and advantages of the present invention will become better understood with regard to the following description, appended claims, and accompanying drawings wherein:

DESCRIPTION OF THE INVENTION

A. Virtual Network Image System (VNIS)

Figure 1:
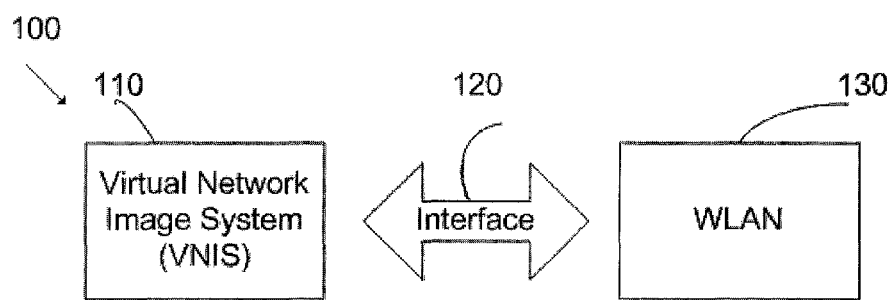
FIG. 1 is a block diagram of a virtual network image system (VNIS) and its corresponding real-world, physical WLAN to which it is interfaced in accordance with the concepts of the present invention.

FIG. 1 shows a system 100 comprising a virtual network image system (VNIS) 110 that is configured to communicate via an interface 120 with a real-world, physical wireless local area network (WLAN) 130. During operation, the VNIS 110 serves as a virtual model or image of the WLAN 130 that is enabled to observe statistics associated with the operation of the physical WLAN 130. Based on the observation of the statistics, the VNIS 110 is able to perform various analyses and predictions using the virtual model or image in order to tune various performance metrics associated with the operating configurations of the WLAN 130 without disturbing or interrupting the WLAN's operation. As a result of the virtual tuning of the operating configurations, many WLAN services that support the deployment and operation of the WLAN 130 are able to be automated.

It should also be appreciated that since the inputs to the VNIS 110 comprise real-time data from the real world WLAN 130, the network model defined by the VNIS 110 accurately represents the real-world WLAN 130. As such, the mismatch that generally occurs between other virtual model of a wireless local area network (WLAN) and the real-world WLAN 130 is substantially deceased or otherwise eliminated by the VNIS 110 of the present invention. Moreover, the significant amount of processing power in current generation computing systems, allows the optimization process employed by the VNIS 110 to run in near real-time as network statistics from the real-world WLAN 130 are communicated to the VNIS 110. Thus, because the VNIS 110 constantly monitors WLAN 130 performance and compares it with the optimal performance from its network modeling, an under-performance of the WLAN 130 is able to be identified and corrected with an optimized set of configurations in near real-time.

Figure 2:
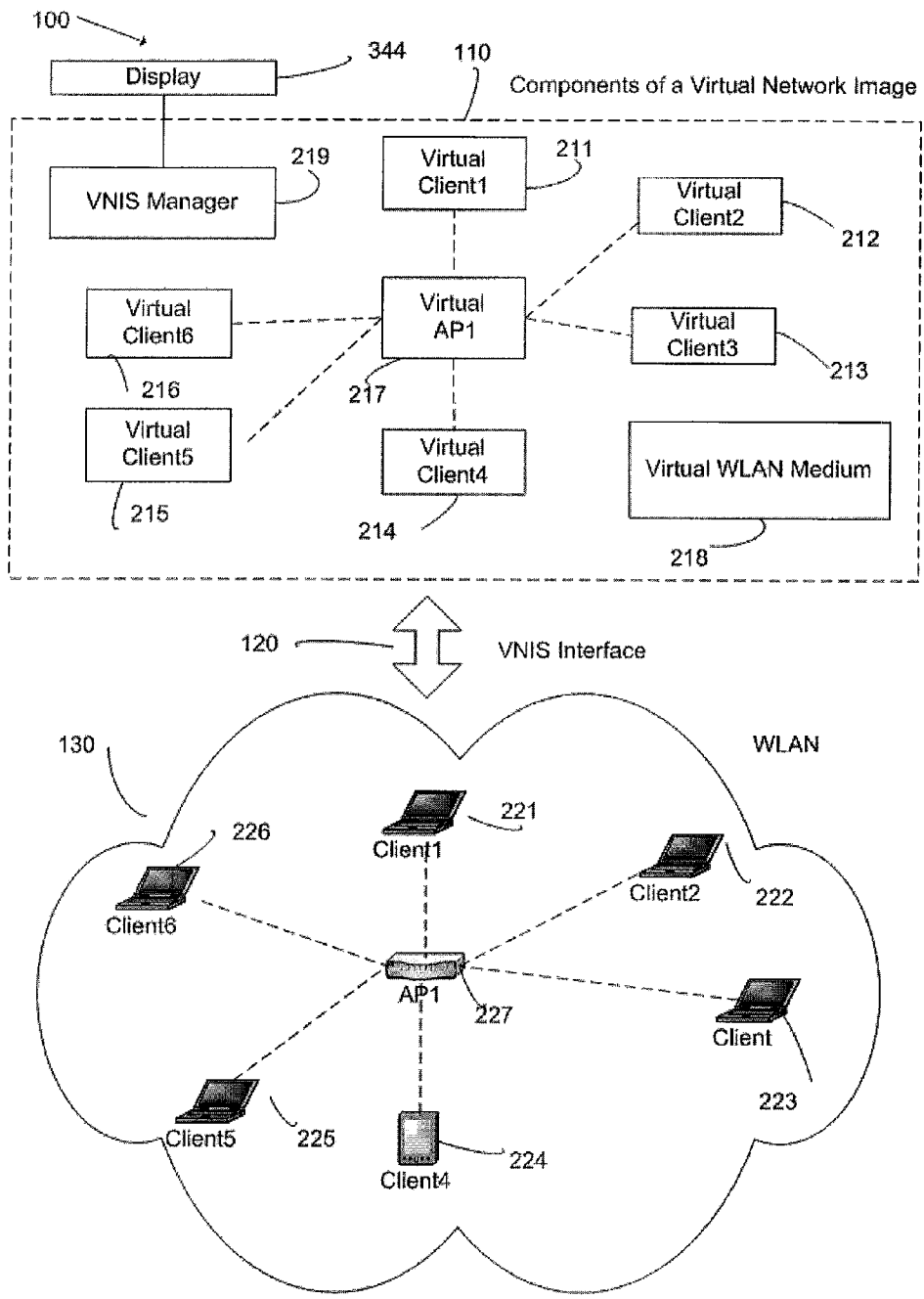
FIG. 2 is a block-diagram of the components of the VNIS and the corresponding components of the physical WLAN shown in FIG. 1 in accordance with the concepts of the present invention.

Specifically, the VNIS 110 is a software abstraction or model of the WLAN system 130 to which it corresponds. In one aspect, the VNIS 110 can be configured as a piece of standalone software; a software component or module; a sub-system; or an embedded system of a network management tool, or it may be embodied in any other desired configuration. The VNIS 110 maintains a virtual representation in the form of individual software objects of each counterpart component found in the real-world, physical WLAN 130. These software objects collectively form a virtual image of the real-world, physical WLAN 130, which may be analyzed and optimized prior to applying a new operating configuration with optimized operating parameters to the physical WLAN 130. The virtual image of the VNIS 110 is made up of virtual entities 211-217 that correspond to each of the real-world, physical network entities 221-227 provided by the structure of the WLAN 130, as shown in FIG. 2. As such, the VNIS 110 performs "what-if" analyses through multiple interactions of changes in the operating metrics of the virtual entities 211-217 to identify new, optimized operating configurations for use by the physical WLAN 130. The outcome of the "what-if" analysis forms the basis of various automated WLAN services to be discussed. It should be appreciated that the WLAN 130 shown and described herein is only one example and that the VNIS 110 of the present invention may be implemented in any telecommunication network. For example, the method and system described herein may be used with packet data other than that following the IEEE 802.11 wireless network standards.

The VNIS 110 may be stored as software on any suitable storage device, such as a floppy disk, CD-ROM, DVD-ROM, hard-disk, flash memory, or any other suitable storage device configured to be interfaced with any general-purpose or application-specific computing system. Alternatively, the VNIS 110 may be implemented in the form of hardware, software, firmware, or any combination thereof, such as system on a chip (SoC). Moreover, a carrier wave that carries the code across a network is another example of a computer-readable medium in which the VNIS 110 may be embodied.

Continuing, the interface 120 facilitates two-way communication between the

WLAN system 130 in the real world and the VNIS 110. The VNIS 110 can obtain the operating configurations and network statistics associated with the WLAN 130 via the interface 120 to keep the VNIS synchronized with the operation of the WLAN 130. It should be appreciated that optimized operating configurations generated by the VNIS 110 can be applied to the WLAN 130 through the interface directly or through other network management tools indirectly. In one aspect, the operating configurations may be comprised of operating parameters, including but not limited to radio frequency, radio transmission power level, threshold for channel clear assessment, medium access parameters, packet retry limits, threshold for start of packet, packet fragmentation threshold, channel scanning frequency, and channel scanning duration. Furthermore, it should be appreciated that the interface 120 may comprise any suitable means of communication, such as simple network management protocol (SNMP), or other suitable standard or proprietary network protocols.

Continuing to FIG. 2, the virtual network nodes or entities 211-217 of the VNIS 110 have a one-to-one correspondence to the network nodes or entities 221-227 of the WLAN 130. In addition to the one-to-one correspondence between the virtual and network entities, the VNIS 110 also contains a virtual wireless medium component (virtual WLAN medium) 218, which comprises a component of the VNIS 110 that represents or otherwise models a virtual wireless medium, such as air, in which the wireless network communications of the WLAN 130 propagate.

The VNIS 110 also includes a VNIS manager component (virtual managing component) 219 that is in communication with each of the virtual entities or nodes 211-217. Specifically, the VNIS manager 219 serves as a controlling module and employs an optimization algorithm used to tune a set of WLAN operating configurations in an iterative manner. In particular, the optimization target, generally defined by one or more WLAN performance metrics, is formed from the data collected by the VNIS manager 219 from each of the VINS virtual entities 211-217. In one embodiment, one or more of the VNIS virtual nodes or entities 211-217 runs or executes a WLAN medium access control (MAC) protocol that mimics the protocols used by the real-world, physical WLAN 130, so as to allow the VNIS 110 to generate WLAN statistics and performance metrics that correspond to those statistics that would be generated by the physical WLAN 130. In addition to a set of optimized configurations, one or more optimized performance metrics may be compared with corresponding performance metrics of the real-world, physical WLAN 130 so that a network administrator is alerted when the difference between the two is significant. Alternatively, the optimized configurations may be applied to the WLAN 130 automatically without the intervention of the WLAN administrator.

The network entities 221-227 of the real-world, physical WLAN 130 comprise the network nodes that are formed by one or multiple wireless access point (AP) 227 and multiple subscriber units or mobile client stations 221-226 that are in wireless network communication therewith. As such, the virtual entities (virtual clients) 211-216 of the VNIS 110 correspond to the network entities (network clients) 221-227 of the WLAN 130, and the virtual entity (virtual access point) 217 of the VNIS 110 corresponds to the wireless access point 227 of the WLAN 130. In addition, the WLAN 130 may also contain other network entities, including one or more wireless domain services (WDS) and one or more access switches (AS), which are not shown. The mobile stations 221-226 are configured to communicate with the access point 227. The AP 227 may communicate with one or more satellites or via Ethernet to enable communication with various other devices that are coupled to an IP (internet protocol) network or any other wired or wireless communication network. For example, mobile stations 221-226 may include wireless telephones; personal communication systems, such as personal digital assistants (PDAs); laptop computers; pagers; or any other wireless device that provides voice, video, data, or other wireless service. The mobile stations 221-226 may also communicate directly with other devices, such as other network nodes, using suitable wireless communication techniques. Each access point 227 is in communication with a WDS and access switch, although multiple access points may report to one WDS. The access points 227 are coupled to the IP network and allow mobile stations 221-226 to communicate with the other devices coupled to the WLAN 130. For example, the WLAN 130 may include network-accessible devices, including an access router, core router, or any other network entity. The WLAN 130 may include any number of sub-networks and routers. In one aspect, the sub-networks can form any other suitable network topology other than a local area network (LAN), including a wide area network (WAN), an enterprise network, or a metropolitan area network, for example.

B. VNIS Information Flows and Interface Modules

Figure 3:
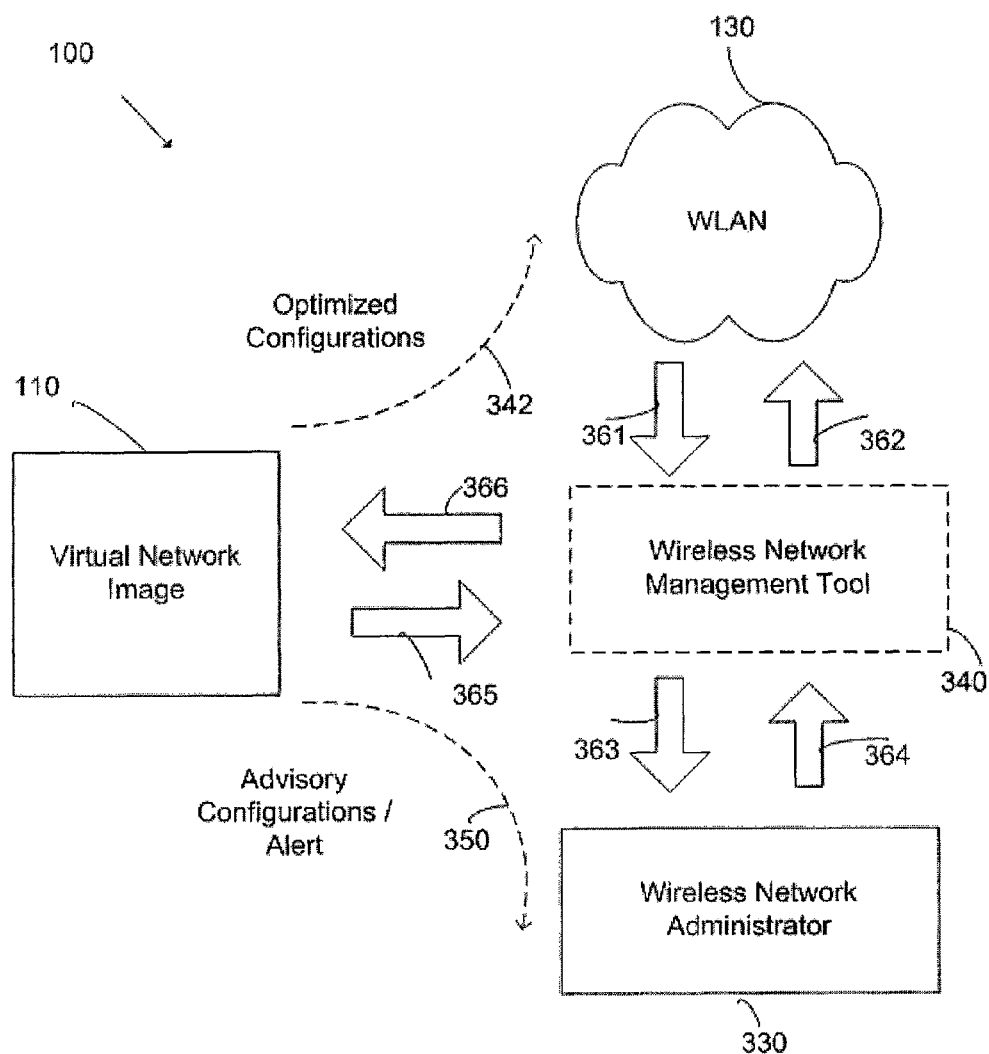
FIG. 3 is a block diagram showing the information flows between the virtual network image system (VNIS) and the related WLAN entities in accordance with the concepts of the present invention.

FIG. 3 illustrates the information or data flows between the VNIS 110, the WLAN 130, a wireless network administrator 330, a wireless network management tool 340, and various communication interfaces 361,362,363,364,365,366. In one aspect, when the VNIS 110 generates a set of optimized operating configurations, the VNIS 110 can automatically apply the optimized configurations to the WLAN 130, as shown by the indicator 342, via suitable protocols, including simple network management protocol (SNMP), or any other suitable protocol, including proprietary protocols. Alternatively, the optimized configurations can also be presented upon any suitable display 344 coupled to the VNIS manager 219 to notify the network administrator 330 as an advisory suggestion or alert, as shown by the indicator 350.

The network management tool 340 comprises a software and/or hardware interface that is able to bilaterally communicate with the WLAN 130, as indicated by identifiers 361, 362. As such, the VNIS 110 and/or the network administrator 330 are able to utilize the network management tool 340 to communicate with the WLAN 130 to modify or otherwise adjust one or more operating parameters of the WLAN's 130 operating configuration. In other words, the wireless network administrator 330 and the VNIS 110 are able to have bilateral communications with the wireless network management tool 340, as indicated by respective identifiers 363,364 and 365, 366, so as to communicate with the WLAN 130. Thus, the VNIS 110, as well as the wireless network administrator 330, are able to transfer optimized configurations to the WLAN 130 and/or receive statistical data regarding the operation of the WLAN 130, as indicated by respective sets of identifiers 365,366 and 363,364.

Moreover, the wireless network management tool 340 communicates with the network devices 221-227 using various protocols via a wired or wireless communication medium to collect network statistics, while also providing a user interface to the network administrators 330 for viewing network information, such as statistics and locations, and entering or adjusting the network configuration parameters.

C. Virtual Network Entities/Nodes

Figure 4:
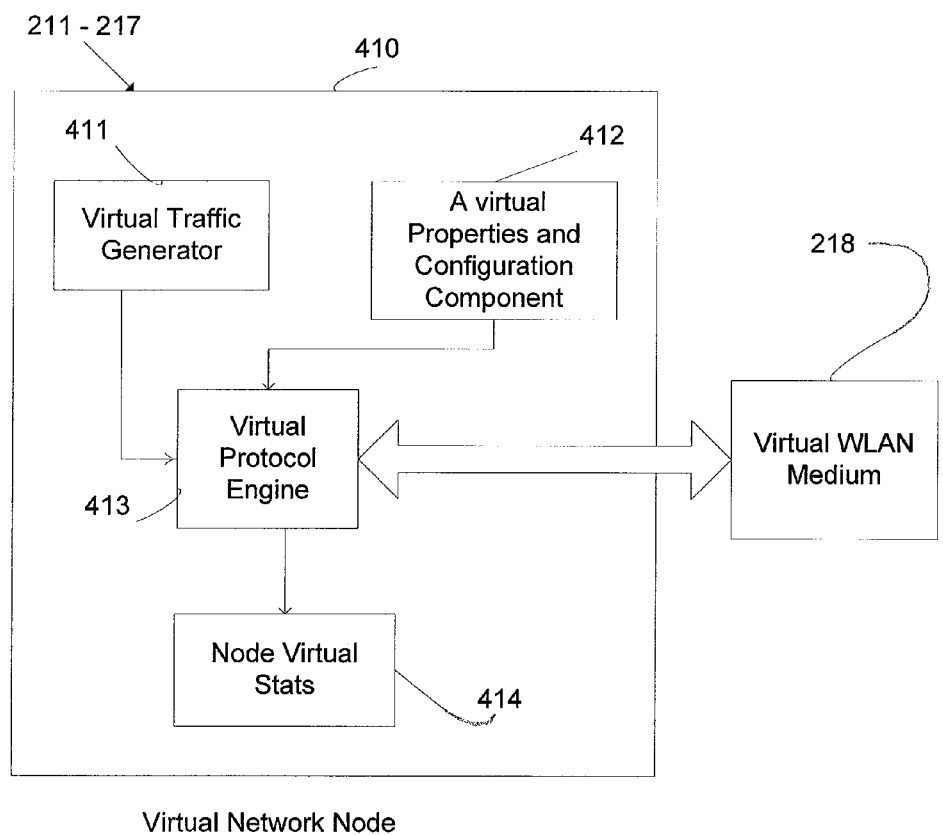
FIG. 4 is a block diagram of the components and interactions of a virtual network node or entity of the VNIS in accordance with the concepts of the present invention.

FIG. 4 shows the components, interactions, and data flows provided by one of the virtual network entities or nodes 211-217 of the VNIS 110. Each virtual node 211-217 contains a virtual properties and configurations component (properties component) 412 for the particular real-world, physical WLAN 130 node or entity 221-227 it represents. Such virtual network node or entity properties or metric include the node location, physical layer properties, radio frequency (RF) properties, and medium access control (MAC) properties. The virtual network nodes 211-217 also include a virtual traffic generator 411, which represents or models the traffic flows of data/information and their associated characteristics found on the physical WLAN 130.

The virtual network nodes or entities 211-217 also include a virtual protocol engine 413, which is capable of running or executing layer-2 (medium access and data link) protocols and any other upper layer protocols of the OSI (open system interconnection) protocol reference model under the coordination of the VNIS manager 219. The virtual protocol engine 413 communicates with the virtual wireless medium component 218 to identify the medium occupying states for the radio frequency channels and the parameters regarding the medium, such as air, through which the WLAN communications travel. In addition, the virtual protocol engine 413 is also configured to receive traffic flow data from the virtual traffic generator 411 and operating configurations with operating parameters associated with WLAN 130 operation from the properties and configurations component 412. In response to the traffic flow and operating configuration data, the virtual protocol engine 413 operates to mimic the network events of the physical WLAN 130, resulting in the generation of network events, such as, but not limited to, the transmission of data traffic from the virtual traffic generator 411 and the receiving of data packets from other virtual network nodes or entities. One network event often generates one or a plurality of new network events. A network event may also result in new network statistic data, such as throughputs and packet delay, which are collected and processed by a node virtual stats component 414.

D. Virtual Network Image Manager

Figure 5:
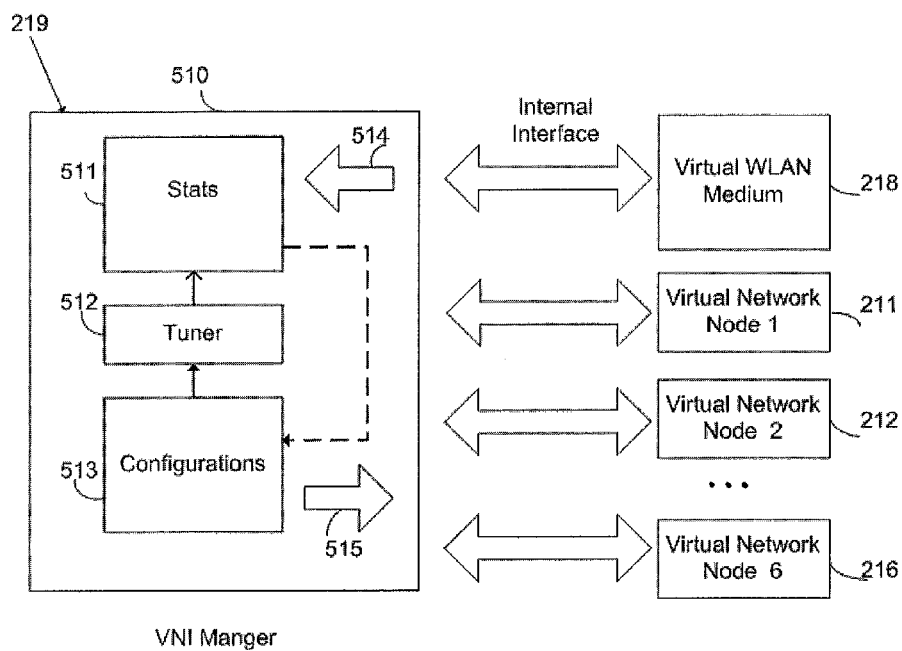
FIG. 5 is a block diagram of a network image manager of the VNIS in accordance with the concepts of the present invention.

FIG. 5 shows the VNIS manager 219, which contains a set of operating configurations 513 that are applied to the virtual nodes 211-217. As previously discussed, the operating configurations include operating parameters associated with the operation of the WLAN 130. Specifically, the main task for the VNIS manager 219 is to schedule the sequential discrete execution of network events generated by the virtual network nodes or entities 211-217. As the virtual protocol engine 413 executes an event belonging to a particular virtual node 211-217, it collects operating statistics 511, which include, but are not limited to: packet size distributions, traffic load distributions, packet error rates, packet retry rates, throughput, packet latency, packet jitter, transmission rate distributions, or the number of neighboring service sets. These statistics 511 are compared with the network statistics from the real-world, physical WLAN 130 to ensure that the WLAN 130 is running optimally. If the difference between the virtual and real-world performance statistics, such as throughputs, packet delay and jitter, is outside some predetermined threshold or range, an alert can be triggered to warn the WLAN administrator 330 via the display 344. Or alternatively, an optimized set of configurations can be applied automatically to the real-world WLAN 130 via the interface 120 to compensate for any network abnormalities.

The VNIS manager 219 also contains a tuner component 512, which contains the necessary logic to carry out the optimizing procedure. Once the statistics are analyzed, the tuner component 512 of the VNIS 110 proceeds to optimize the operating configuration via the algorithm to compensate for variations in performance statistics or operating metrics between that identified by the VNIS 110 and that of the WLAN 130. After the optimization has been completed, the VNIS manager 219 applies a set of configurations to the WLAN nodes 221-227, as shown by identifier 515. The VNIS manager 219 collects a set of network statistics and performance metrics from the WLAN nodes 221-227, as shown by 514.

Figure 6:
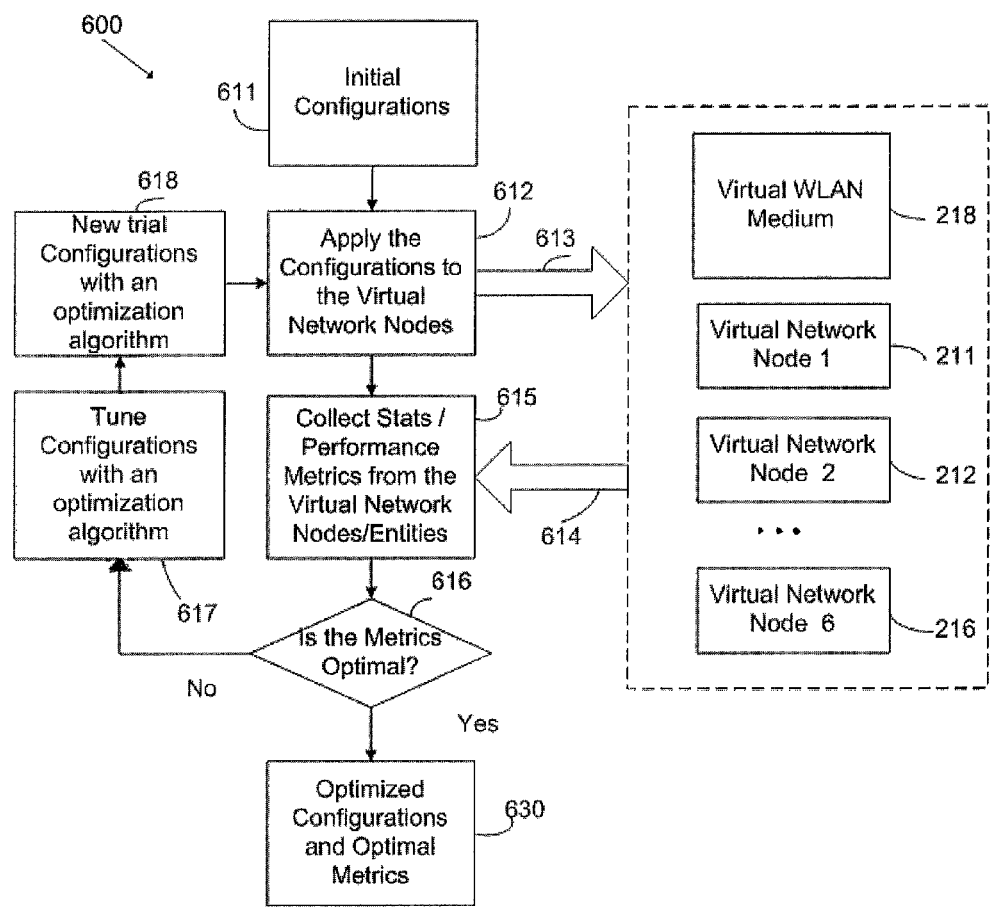
FIG. 6 is a flow diagram of the optimization logic that the virtual network image manager carries out in accordance with the concepts of the present invention.

With the functional portions of the VNIS manager 219 set forth, the operational steps taken by the tuner component 512 to optimize a WLAN 130 operating configuration are generally referred to by the numeral 600, as shown in FIG. 6. That is, the process 600 illustrates the optimization logic utilized by the tuner component 512 of the VNIS manager 219, whereby optimized operating configurations are obtained through an iterative process. Initially, at step 611, the tuner component 512 processes an initial set of WLAN operating configurations 513 as initial inputs. In one aspect, the operating configurations 513 may comprise current or default configurations of the real-world, physical WLAN nodes or entities 221-227. The tuner component 512 then applies the configurations 513 to the virtual nodes 211-217 in the VNIS 110, as indicated at step 612, and activates the virtual protocol engine 413 on each virtual node or entity 211-217. The virtual protocol engines 413 miming on each of the virtual nodes 211-217 then generate network events, such as receiving or transmitting a packet, medium sensing, and transmitting an acknowledgement packet, which are applied to the virtual nodes or entities 211-217. As these network events execute, WLAN statistics and performance metrics identified by node virtual stats component are generated by the virtual nodes or entities 211-217 and are collected by the tuner component 512 as shown by the flow of 614. Next, at step 616, the tuner 512 checks whether these metrics have reached their optimized value based on the predetermined criteria. If not, the process continues to step 617, where the tuner component 512 of the VNIS manager 219 tunes the operating configurations with an optimization algorithm, obtains a new set of testing configurations at step 618, and applies them to the virtual nodes or entities 211-217, as indicated at step 612 and the flow 613. The optimization algorithm utilized at step 617 may comprise any appropriate optimization algorithm, such as a Generic optimization algorithm. When the metrics reach optimums, this iteration process ends with a set of optimized operating configurations and optimal metrics, as indicated at step 630.

When running "what-if" analyses, the VNIS manager 219 can tune not only the operating configurations, but can also tune or otherwise modify the algorithms themselves. This allows the VNIS 110 to be used as a "virtual beta site" to serve as a testing environment for new network parameters or algorithms that may be desired, without the need for the use of an expensive physical testing environment.

Thus, the VNIS 110 as described above provides a system to model and test "tuned" WLAN operating configurations in a virtual environment that is separate from that of the physical WLAN 130. Due to this virtual nature, the VNIS 110 is able to provide several support services for WLANs 130, as discussed below.

E.1. WLAN Planning Service

The VNIS 110 can be used as a very low-cost, highly-efficient tool to plan WLAN 130 deployments, including RF (radio frequency) planning, especially for those particularly tailored to target certain data throughput performance metrics, such as low-latency performance to support the operation of voice networks and low-packet loss performance to support the operation of video networks.

E.2. WLAN Performance Tuning Service

Alternatively, the VNIS 110 can be configured to first tune metrics of an operating configuration within its virtual system iteratively until the performance metrics are optimized. Then it provides the set of optimized configurations as informational advice to the WLAN 130 administrator or, alternatively, can apply the optimized configurations to the WLAN 130 automatically. Another way to use this tuning service is for the WLAN 130 administrator 330 to apply the desired new set of operating configurations to the VNIS 110 to verify its performance first, before they are applied to the real world WLAN 130. This trial and verify approach can reduce the potential devastating effects caused by suboptimal configurations.

E.3. WLAN Performance Monitoring and Tracking Service

The VNIS 110 can track the operating configurations, WLAN 130 statistics, and performance metrics from the real-world WLAN 130 and compare the performance metrics with the optimized configurations it generates. That is, the tracking process of the VNIS 110 involves collecting WLAN 130 network performance statistics, such as throughputs, delays, jitters, and generating optimal performance metrics under optimal configurations, which are compared with the real-world performance of the WLAN 130. When the differences in one or more metrics are beyond some predetermined threshold, the VNIS 110 can alert the WLAN administrator 330 along with a set of optimized advisory configurations. Or, alternatively, it automatically applies the optimized configurations to the WLAN 130. The tracking process can be carried out with a low-priority task.

E.4. Virtual Beta Site Service

The VNIS 110 provides a virtual testing environment to test new algorithms, new configurations, or a new WLAN 130 topology, which reduces the potential risk of devastating WLAN 130 performance degradation.

It is to be understood that the process and services described above are only examples and that the process and services may be modified without departing from the scope of the invention. For example, the method can easily be extended so that the VNIS 110 manager and virtual wireless medium 218 are physically separated from the virtual entities or nodes 211-217 with other components in the VNIS 110.

It will, therefore, be appreciated that one advantage of one or more embodiments of the present invention is that a virtual network image system (VNIS) provides a software model of a real-world, physical wireless local area network (WLAN) that utilizes virtual entities that interact in accordance with a virtual protocol. Another advantage of the present invention is that the VNIS provides a low-cost and efficient planning tool that can be used to plan WLAN deployments. Still another advantage of the present invention is that the VNIS provides a manner in which to tune the WLAN without having to take the WLAN offline. Yet another advantage of the present invention is that the VNIS provides a manner in which to track statistics and performance metrics of the WLAN. An additional advantage of the present invention is that the VNIS avoids the inefficiencies that are associated with applying unoptimized or suboptimal configurations directly to the WLAN 130.

Although the present invention has been described in considerable detail with reference to certain embodiments, other embodiments are possible. Therefore, the spirit and scope of the appended claims should not be limited to the description of the embodiments contained herein.

What is claimed is:

1. An optimization system for optimizing a wireless network comprising:
   a plurality of virtual network entities including at least one virtual network client entity that correspond to a plurality of network entities that includes at least one network client entity that communicate through a wireless network, said plurality of virtual network entities and said at least one virtual network client entity communicating through a virtual network corresponding to the wireless network in accordance with a virtual network communication protocol that corresponds to a communication protocol of the wireless network, wherein said virtual network, said plurality of virtual network entities and said at least one virtual network client entity communicate in accordance with a wireless communication operating configuration; and
   a virtual managing component adapted to be in communication with the wireless network via an interface to monitor its operation, said virtual managing component in communication with said plurality of virtual network entities including said at least one virtual network client entity, said virtual managing component acquiring wireless communication operation data associated with an operation of the wireless network in real-time and applying the wireless communication operation data to said virtual network and said plurality of virtual network entities, whereby said virtual managing component modifies said wireless communication operating configuration in real-time, to optimize wireless communication performance between said virtual network, said plurality of virtual network entities, and said at least one virtual network client entity based on virtual performance data associated with an operation of said virtual network, said plurality of virtual network entities, and said at least one virtual network client entity;
   wherein said virtual managing component applies said modified wireless communication operating configuration to the wireless network via said interface to optimize wireless communication performance between the plurality of network entities of the wireless network.

2. The system of claim 1, wherein said plurality of virtual network entities comprise software objects.

3. The system of claim 1, further comprising a virtual medium component in communication with said virtual managing component, said virtual medium component defining a communication medium in which said plurality of virtual network entities communicate.

4. The system of claim 1, wherein said plurality of virtual network entities comprise at least one virtual client and one virtual access point in network communication therewith.

5. The system of claim 4, wherein said plurality of virtual network entities comprise:
   a virtual protocol engine to execute said virtual network communication protocol;
   a virtual traffic generator defining data traffic of a wireless local area network; and
   a properties component defining at least one operating parameter of said plurality of virtual network entities.

6. The system of claim 1, wherein said wireless communication operating configuration includes at least one operating parameter selected from the group consisting of radio frequency, radio transmission power level, threshold for channel clear assessment, threshold for start of packet, packet fragmentation threshold, channel scanning frequency, channel scanning duration, and packet retry limits.

7. The system of claim 1, wherein said virtual network communication protocol comprises medium access control (MAC) protocol.

8. The system of claim 1, wherein said plurality of virtual network entities independently execute said virtual network communication protocol.

9. A method of optimizing an operation of a wireless network comprising the steps of:
   representing a plurality of network entities that includes at least one network client entity that communicate through the wireless network with corresponding virtual network entity models having at least one virtual network entity client model that communicate through a virtual network model that corresponds with said wireless network in accordance with a virtual network protocol of the wireless network, wherein said virtual network entity models and said at least one virtual network client model communicate in accordance with a wireless communication operating configuration, said plurality of network entities in communication with a virtual managing component;

executing an operation of said virtual network entity models in accordance with a predetermined operating configuration;

acquiring wireless communication operation data from said wireless network in real-time;

comparing said wireless communication operation data from said wireless network with that of said virtual models; and optimizing in real-time said wireless communication operating configuration based on said comparing step that optimizes the wireless communication performance between the virtual network model and the virtual network entity models having the at least one virtual network entity client model; and applying said modified wireless communication operating configuration to said wireless network to optimize wireless communication performance between said plurality of network entities of said wireless network.

10. The method of claim 9, wherein said virtual network protocol comprises medium access control (MAC) protocol.

11. The method of claim 9, wherein said virtual models independently execute said virtual network protocol.

12. The method of claim 9, wherein said virtual models include:

a virtual protocol engine to execute said virtual network protocol;

a virtual traffic generator defining data traffic of the wireless network; and a properties component defining operating parameters of said plurality of network entities.

13. The method of claim 9, wherein said optimizing step is performed by a generic algorithm.

* * * * *